United States Patent
Varadarajan et al.

(10) Patent No.: US 7,693,227 B2
(45) Date of Patent: Apr. 6, 2010

(54) CHANNEL LENGTH ESTIMATION AND ACCURATE FFT WINDOW PLACEMENT FOR HIGH-MOBILITY OFDM RECEIVERS IN SINGLE FREQUENCY NETWORKS

(75) Inventors: Badri N. Varadarajan, Dallas, TX (US); Anand G. Dabak, Plano, TX (US); Charles Sestok, Dallas, TX (US); Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1009 days.

(21) Appl. No.: 11/389,354

(22) Filed: Mar. 23, 2006

(65) Prior Publication Data
US 2006/0222099 A1 Oct. 5, 2006

Related U.S. Application Data

(60) Provisional application No. 60/666,887, filed on Mar. 31, 2005, provisional application No. 60/710,462, filed on Aug. 22, 2005, provisional application No. 60/714,092, filed on Sep. 2, 2005.

(51) Int. Cl.
*H04L 27/28* (2006.01)

(52) U.S. Cl. .................................................. 375/260
(58) Field of Classification Search ................. 375/260, 375/340, 342, 354
See application file for complete search history.

(56) References Cited

U.S. PATENT DOCUMENTS

| 7,020,116 | B1 * | 3/2006 | Nakada | 370/338 |
| 2003/0138060 | A1 * | 7/2003 | Alcouffe | 375/324 |
| 2003/0219084 | A1 * | 11/2003 | Parker | 375/343 |
| 2009/0060076 | A1 * | 3/2009 | Ma et al. | 375/260 |

* cited by examiner

*Primary Examiner*—Don N Vo
(74) *Attorney, Agent, or Firm*—Ronald O. Neerings; Wade James Brady, III; Frederick J. Telecky, Jr.

(57) ABSTRACT

A method of estimating a channel length (304) in a wireless receiver is disclosed. The receiver receives a signal (122) from a remote transmitter. The receiver selects a plurality (K) of different candidate channel lengths and determines a respective criterion value (402) of the signal for each of the plurality of different candidate channel lengths. The receiver selects a channel length (410) from the plurality of different candidate channel lengths in response to the respective criterion value (404).

19 Claims, 10 Drawing Sheets

US 7,693,227 B2

CHANNEL LENGTH ESTIMATION AND ACCURATE FFT WINDOW PLACEMENT FOR HIGH-MOBILITY OFDM RECEIVERS IN SINGLE FREQUENCY NETWORKS

CROSS-REFERENCES TO RELATED APPLICATIONS

This application claims the benefit, under 35 U.S.C. §119 (e)(1), of U.S. Provisional Application No. 60/666,887, filed Mar. 31, 2005, U.S. Provisional Application No. 60/710,462, filed Aug. 22, 2005, and of U.S. Provisional Application No. 60/714,092, filed Sep. 2, 2005, and incorporated herein by this reference.

BACKGROUND OF THE INVENTION

The present embodiments relate to wireless communications systems and, more particularly, to the evolution of High-Mobility receivers for Orthogonal Frequency Division Multiplexing (OFDM) systems applications such as Digital Video Broadcast-Handheld (DVB-H) transmission.

Wireless communications are prevalent in business, personal, and other applications, and as a result the technology for such communications continues to advance in various areas. One such advancement includes the use of spread spectrum communications, including that of code division multiple access (CDMA) which includes wideband code division multiple access (WCDMA) cellular communications. In CDMA communications, user equipment (UE) (e.g., a hand held cellular phone, personal digital assistant, or other) communicates with a base station, where typically the base station corresponds to a "cell." CDMA communications are by way of transmitting symbols from a transmitter to a receiver, and the symbols are modulated using a spreading code which consists of a series of binary pulses. The code runs at a higher rate than the symbol rate and determines the actual transmission bandwidth. WCDMA includes alternative methods of data transfer, one being frequency division duplex (FDD) and another being time division duplex (TDD, where the uplink and downlink channels are asymmetric for FDD and symmetric for TDD. Another wireless standard involves time division multiple access (TDMA) apparatus, which also communicate symbols and are used by way of example in cellular systems. TDMA communications are transmitted as a group of packets in a time period, where the time period is divided into time slots so that multiple receivers may each access meaningful information during a different part of that time period. In other words, in a group of TDMA receivers, each receiver is designated a time slot in the time period, and that time slot repeats for each group of successive packets transmitted to the receiver. Accordingly, each receiver is able to identify the information intended for it by synchronizing to the group of packets and then deciphering the time slot corresponding to the given receiver. Given the preceding, CDMA transmissions are receiver-distinguished in response to codes, while TDMA transmissions are receiver-distinguished in response to time slots.

The wireless medium affects a transmitted signal in many ways. For example, the transmitted signal is likely reflected by objects such as the ground, mountains, buildings, and other things that it contacts. Consequently, a received signal is a superposition of variously delayed copies of the transmitted signal. Each such copy is said to be a channel path. The result of these combining paths or channel distortion is that the frequency domain spectrum of the transmitted signal is scaled differently on different frequencies. In addition to channel distortion, the received signal is corrupted by thermal noise in the receiver front end and by other interfering signals. A major task of the receiver is to estimate the transmitted data from the noisy, distorted received signal. This typically requires a channel estimate of channel distortion. Next, equalization uses the channel estimate to correct the channel distortion.

Various approaches have been developed in an effort to reduce or remove the channel effect from the received signal so that the originally-transmitted data is properly recognized. In other words, these approaches endeavor to improve signal-to-noise ratio (SNR), thereby improving other data accuracy measures (e.g., bit error rate (BER), frame error rate (FER), and symbol error rate (SER)). For example, CDMA systems use a spreading code having correlation properties that enable the receiver to detect path delays and scale factors. OFDM systems combat distortion by sending the data in the frequency domain, so channel distortion produces independent scaling of each data signal by a different scale value.

While the preceding approaches provide steady improvements in wireless communications, the present inventors recognize that still further improvements may be made, including by addressing some of the drawbacks of the prior art. In particular, these improvements are directed to improvements in high mobility OFDM receivers in single frequency wireless networks. These improvements may be included in user equipment together with previously described communication modes. Examples of these improvements addressed by embodiments of the present invention include improved FFT window placement and improved channel length estimation. Accordingly, the preferred embodiments described below are directed toward these benefits as well as improving upon the prior art.

BRIEF SUMMARY OF THE INVENTION

In a first preferred embodiment, a receiver improves OFDM channel length estimation, thereby improving channel estimation. The receiver selects different candidate channel lengths for processing the received OFDM symbol. The maximum energy of the symbol is calculated for each candidate channel length. The receiver determines a maximum candidate channel length that has a maximum energy that is substantially less than a maximum energy of other candidate channel lengths. The receiver selects a minimum candidate channel length that is greater than the maximum candidate channel length that has a maximum energy that is substantially less than a maximum energy of other candidate channel lengths.

In a second preferred embodiment, a receiver provides improved OFDM symbol synchronization with a remote transmitter by hypothesis testing. The receiver selects different candidate channel placements for processing the received OFDM symbol. The receiver processes the OFDM symbol for each candidate channel placement and determines a respective signal quality. This signal quality is preferably a measure of signal-to-noise ratio, noise variance, or other quality criterion. The receiver selects the candidate channel placement having the best signal quality.

According to a third preferred embodiment, a receiver provides improved OFDM symbol synchronization in a fading channel by collecting long term statistics. The receiver selects a candidate channel placement and processes several OFDM symbols using this candidate channel placement. The receiver identifies a primary or strong signal within the channel as well as weaker echo signals. The receiver compares these weaker echoes to threshold values and maintains a cumulative count of echoes that occur before and after the primary signal. The receiver subsequently corrects the candidate channel placement in response to the cumulative count.

Other devices, systems, and methods are also disclosed and claimed.

DETAILED DESCRIPTION OF THE INVENTION

The preferred embodiments of the present invention provide improved synchronization between a wireless receiver and a remote transmitter to reduce interference for a wireless communication system. The wireless communication system preferably provides Digital Video Broadcast-Handheld (DVB-H) applications such as streaming video by Orthogonal Frequency Division Multiplex (OFDM) transmission. Data are transmitted in consecutive blocks called OFDM symbols. Each OFDM symbol includes a set of data signals, pilot signals, and a cyclic prefix. The pilot signals are known signals used for channel estimation at the receiver. The cyclic prefix is typically a copy of the last few data values. A transmitter performs an Inverse Fast Fourier Transform (IFFT) on the data, thereby producing N output values. For example, N may be 2048, 4096, of 8192 in DVB-H systems. The cyclic prefix or guard interval duration may be N/4, N/8, N/16, or N/32 values. The combined cyclic prefix and data are transmitted in one OFDM symbol time.

An OFDM receiver may recover the timing and carrier frequency and then process the received samples through a Fast Fourier Transform (FFT). The cyclic prefix may be discarded and, after the FFT, frequency domain information is recovered. The pilot signals may be recovered to aid in channel estimation so that the data sent on the frequency tones can be recovered. In order to accurately recover the pilot signals, both channel length and FFT window placement must be resolved. Channel length is the time between arrival of the first and last channel paths at the receiver. This time is preferably less than the cyclic prefix duration. An optimal channel length determination permits the FFT to convert only samples within the channel and exclude adjacent noise outside the channel. But even with accurate channel length determination, the FFT window must also be accurately placed with respect to the channel. The present invention is directed to particular solutions to these and other problems as will be discussed in detail.

Figure 1A:
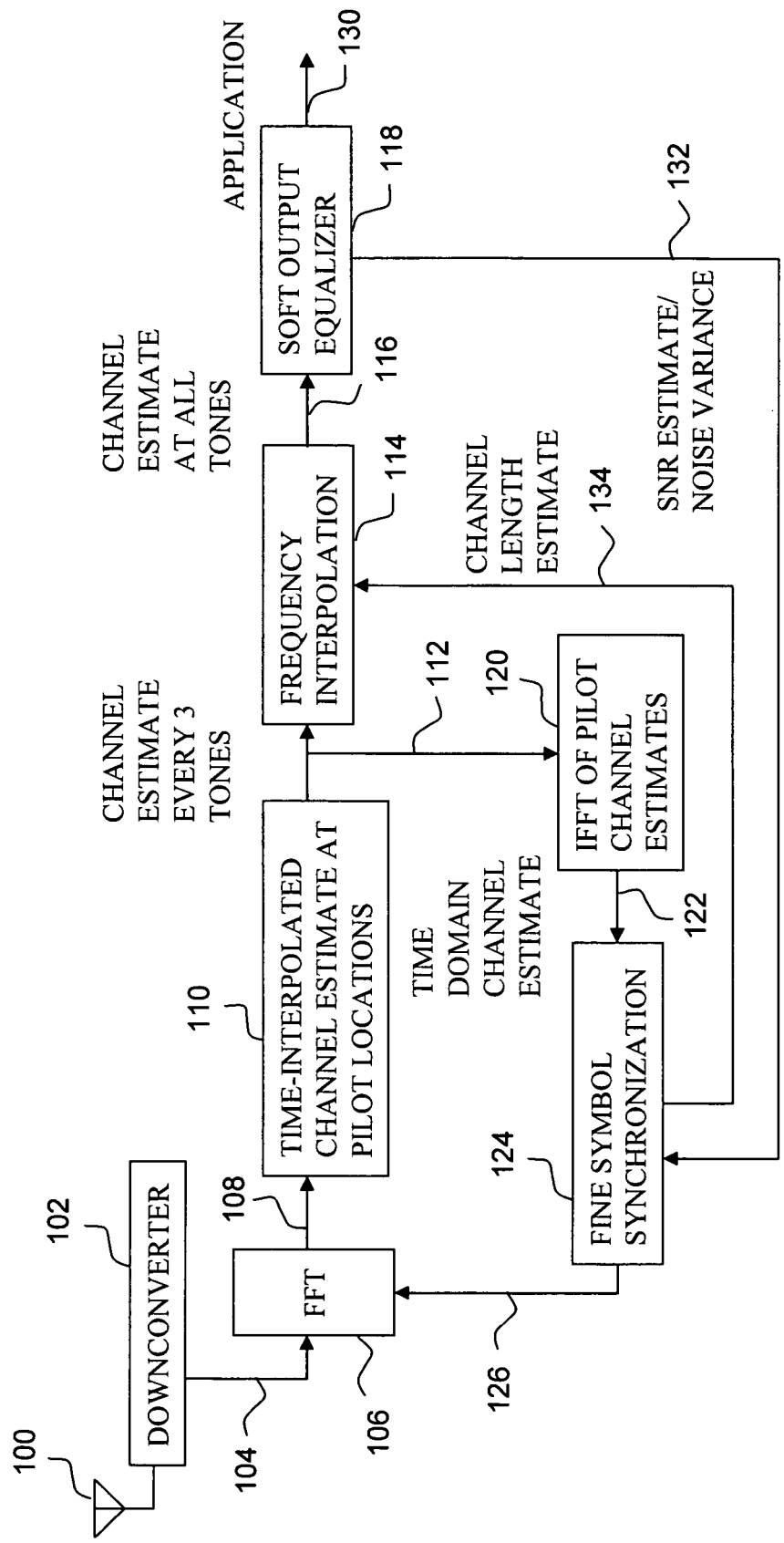
FIG. 1A is a block diagram of a receiver that may employ embodiments of the present invention.
Figure 2:
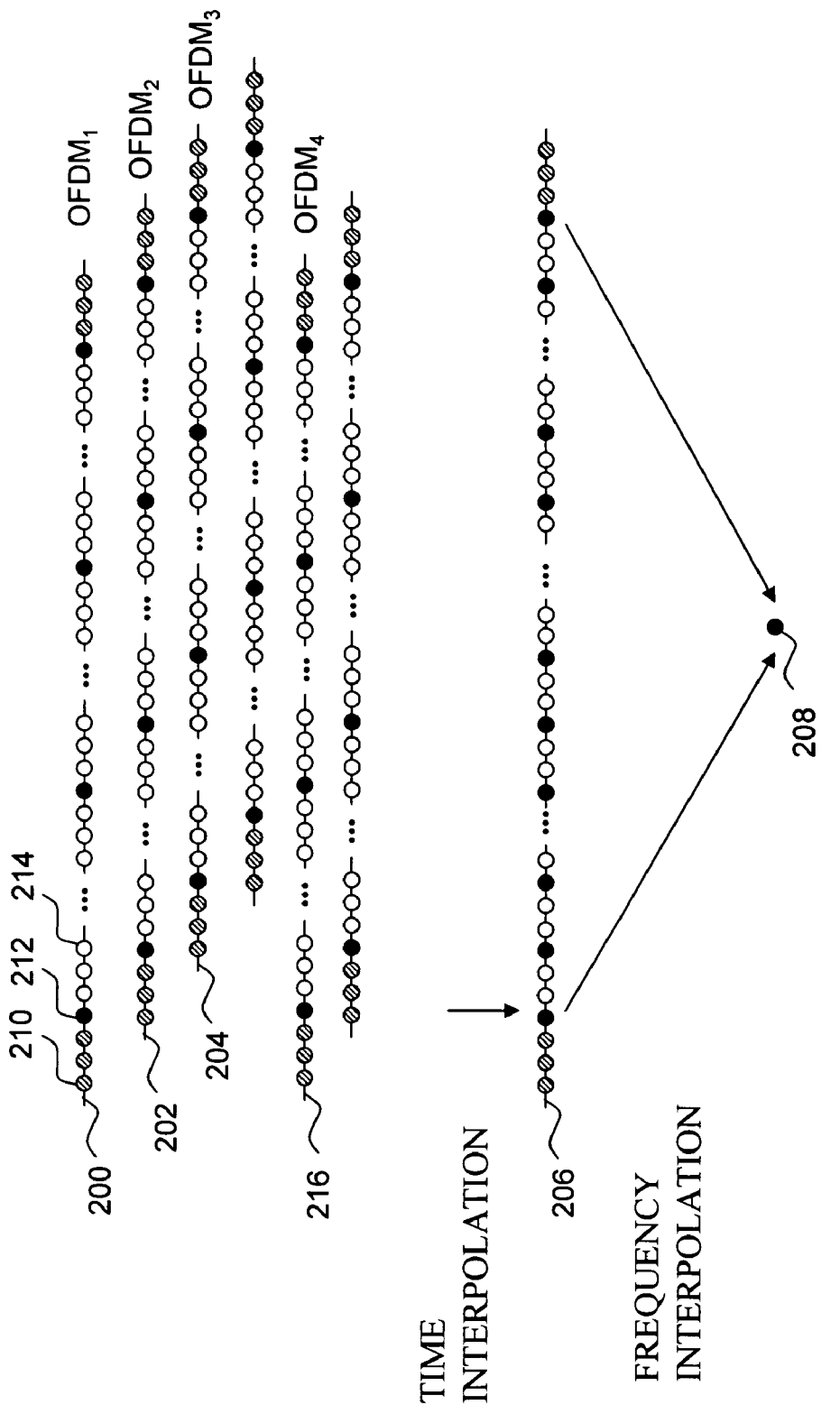
FIG. 2 illustrates time interpolation and frequency interpolation of OFDM symbols by the receiver of FIG. 1A.

A simplified block diagram of a wireless receiver of the present invention for such a system is shown in FIG. 1A. Antenna 100 receives a radio frequency (RF) data stream. Downconverter 102 converts the RF data into baseband signals which are applied to Fast Fourier Transform (FFT) circuit 106 via lead 104. FFT circuit 106 converts the time domain data to frequency domain data. The frequency domain data are discrete frequency data signals or tones that form the baseband OFDM symbol. The OFDM symbol is then applied to circuit 110 along lead 108 to calculate a time-interpolated channel estimate at pilot signal locations. Time interpolation averages the pilot signals over multiple OFDM symbols to increase accuracy. By way of illustration, six of these OFDM symbols are shown at FIG. 2. Each OFDM symbol includes guard signals 210, pilot signals 212, and data signals 214. Pilot signals in consecutive OFDM symbols may be shifted with respect to one another. For example, pilot signals in symbol $OFDM_2$ 202 are shifted three positions (or tones) with respect to symbol $OFDM_1$ 200. In a similar manner, symbol $OFDM_3$ 204 is shifted another three positions with respect to symbol $OFDM_2$ 202. In time interpolation, pilot signals which are at the same frequency location but on different symbols are averaged to improve accuracy. Thus, in the example of FIG. 2, pilot signals on symbols $OFDM_1$ 200 and $OFDM_4$ 216 would be combined. At the output 112 (FIG. 1A) of time interpolation, pilot signals are available at regular intervals in the frequency domain. Thus, in the example of FIG. 2, time-interpolated pilot signals shown in 206 occur at every third position.

Referring back to FIG. 1A, the time-interpolated pilot signals 206 are applied to frequency interpolation circuit 114. Frequency interpolation circuit 114 combines every third signal position to produce pilot signal 208. Since pilot signal 208 is a known signal, it may be used to produce a channel estimate and correct channel distortion of remaining data symbols. The channel estimate is applied to soft output equalizer circuit 118 along lead 116 together with data signals from FFT circuit 106. Soft output equalizer circuit 118 corrects data distortion and produces application data signals on lead 130. In addition to corrected data signals, soft output equalizer circuit 118 also produces spurious data signals due to noise. Soft output equalizer circuit 118 compares these spurious data signals to well-behaved corrected data signals to calculate a signal-to-noise ratio (SNR) or noise variance of the composite signal. This SNR estimate or noise variance estimate is applied to fine symbol synchronization (FSS) circuit 124 via lead 132 as will be discussed in detail.

The time-interpolated pilot signals 206 from circuit 110 are applied to Inverse Fast Fourier Transform (IFFT) circuit 120 along lead 112. IFFT circuit 120 converts the frequency domain pilot signals to a time domain channel estimate at lead 122. This time domain channel estimate is then applied to FSS circuit 124 as will be described in detail. FSS circuit 124 also produces updated channel length estimates to frequency interpolation circuit 114 via lead 134.

Figure 1B:
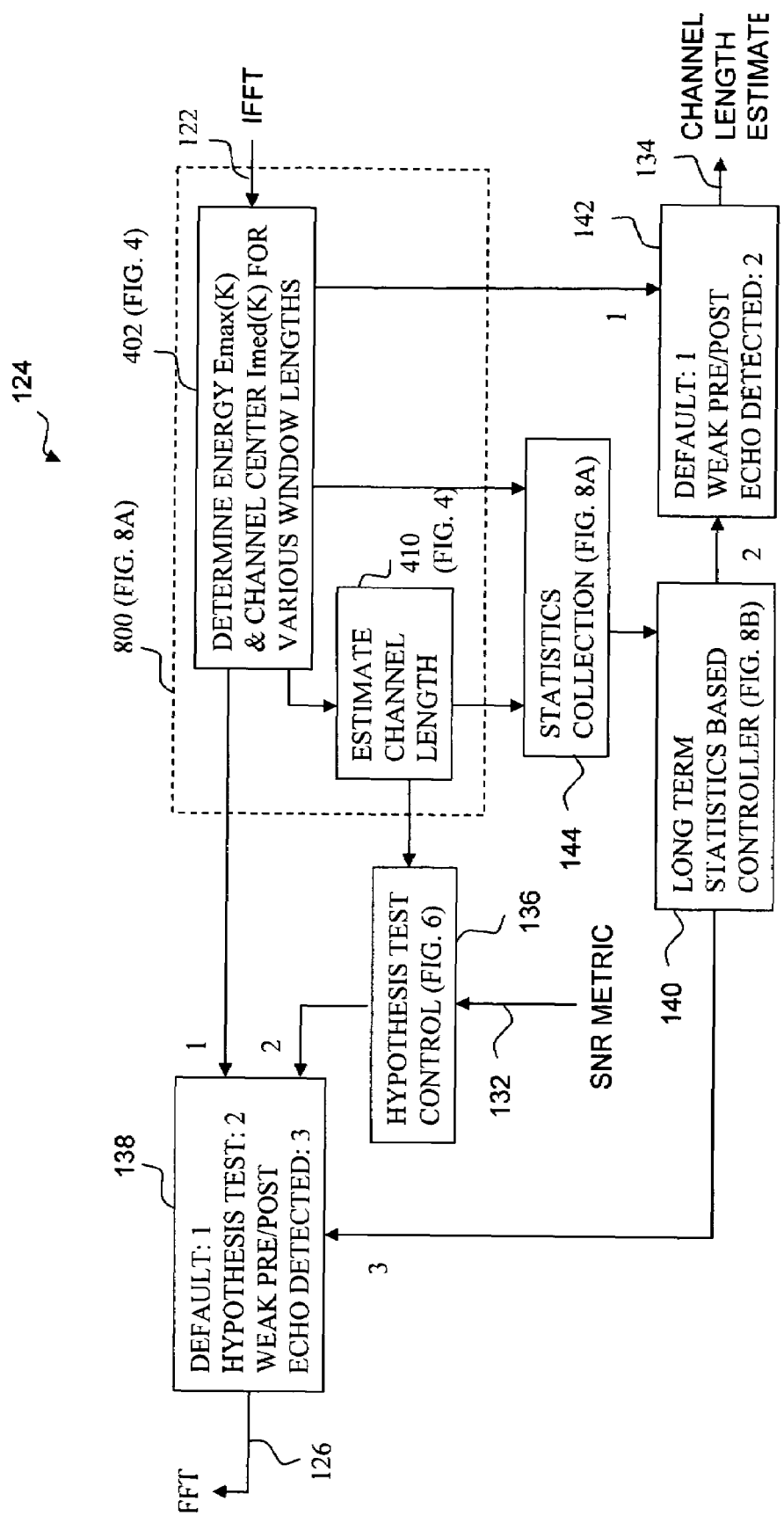
FIG. 1B is a block diagram of the Fine Symbol Synchronization (FSS) circuit 124 of FIG. 1A.
Figure 3:
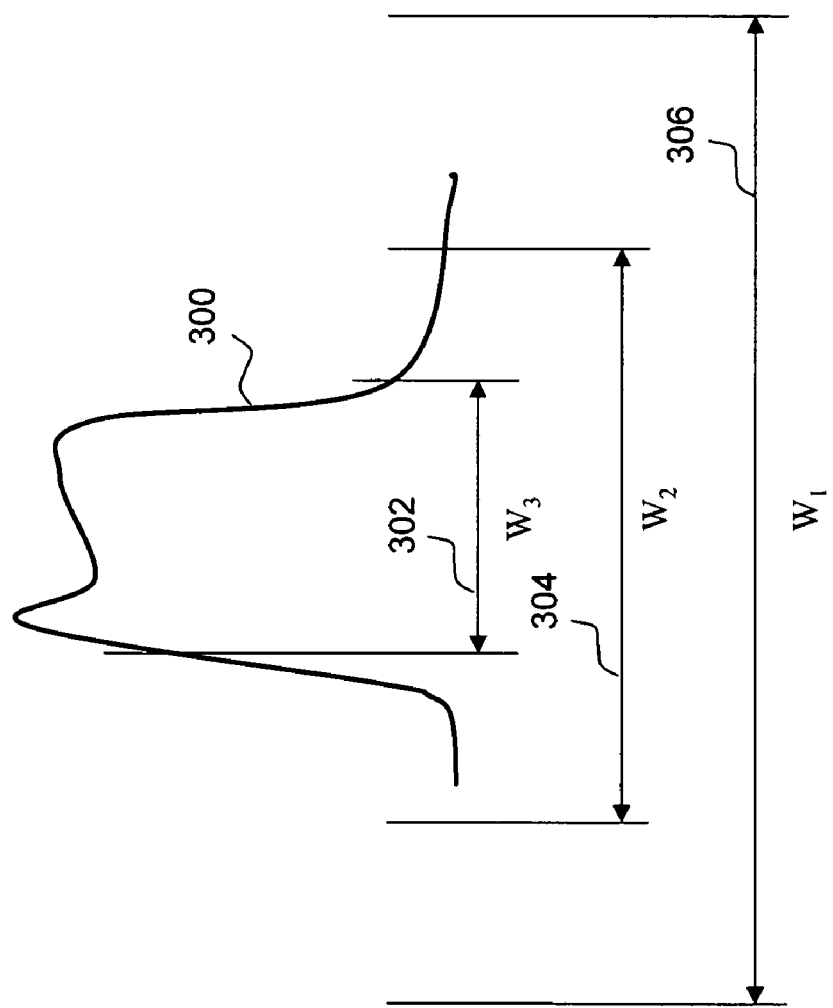
FIG. 3 illustrates the effect of various channel length estimates of the present invention.

Referring to FIG. 1B, there is a block diagram of FSS circuit 124 of FIG. 1A. Operation of FSS circuit 124 will now be described in detail. Block 800 indicated by a dashed line includes blocks 402 and 410. Block 800 provides updated channel length estimates to facilitate frequency interpolation as previously described. Recall that each OFDM symbol includes a time domain guard interval to separate it from adjacent OFDM symbols. In current OFDM receivers, the channel length for frequency interpolation is assumed to be equal to the duration of these guard signals. The present invention, however, advantageously furnishes a technique for estimating the actual channel length. By using this actual estimated channel length instead of assuming the channel length is equal to the guard interval, frequency interpolation will reduce noise and yield more accurate channel estimates. The present invention provides adaptive channel length estimates as shown at FIG. 3. Curve 300 of FIG. 3 illustrates an actual channel. Candidate channel lengths $W_1$ 306, $W_2$ 304, and $W_3$ 302 are preferably predetermined trial channel lengths. For example, if there are N pilot and data signals in an OFDM symbol, $W_1$ might be N/4, $W_2$ might be N/8, $W_3$ might be N/16, and $W_4$ might be N/32. In the example of FIG. 3, candidate channel lengths $W_1$ and $W_2$ include all of channel 300 as well as any noise outside the channel. The signal within the channel is preferably significantly greater than the included noise. A maximum energy for each of windows $W_1$ and $W_2$, therefore, is approximately equal. Candidate channel length $W_3$ 302, however, is less than the actual length of channel 300. Thus, the maximum energy for candidate channel length $W_3$ is perceptibly less than the maximum energy of windows $W_1$ and $W_2$. Circuit 800, therefore, will select candidate channel length $W_2$, since it is a minimum channel length that includes the entire actual channel 300. This adaptive channel length determination advantageously provides a real-time channel length estimate that may be substantially less than the guard interval duration. This smaller, more accurate channel length estimate averages more pilot signals with less noise, thereby improving frequency interpolation.

Figure 4:
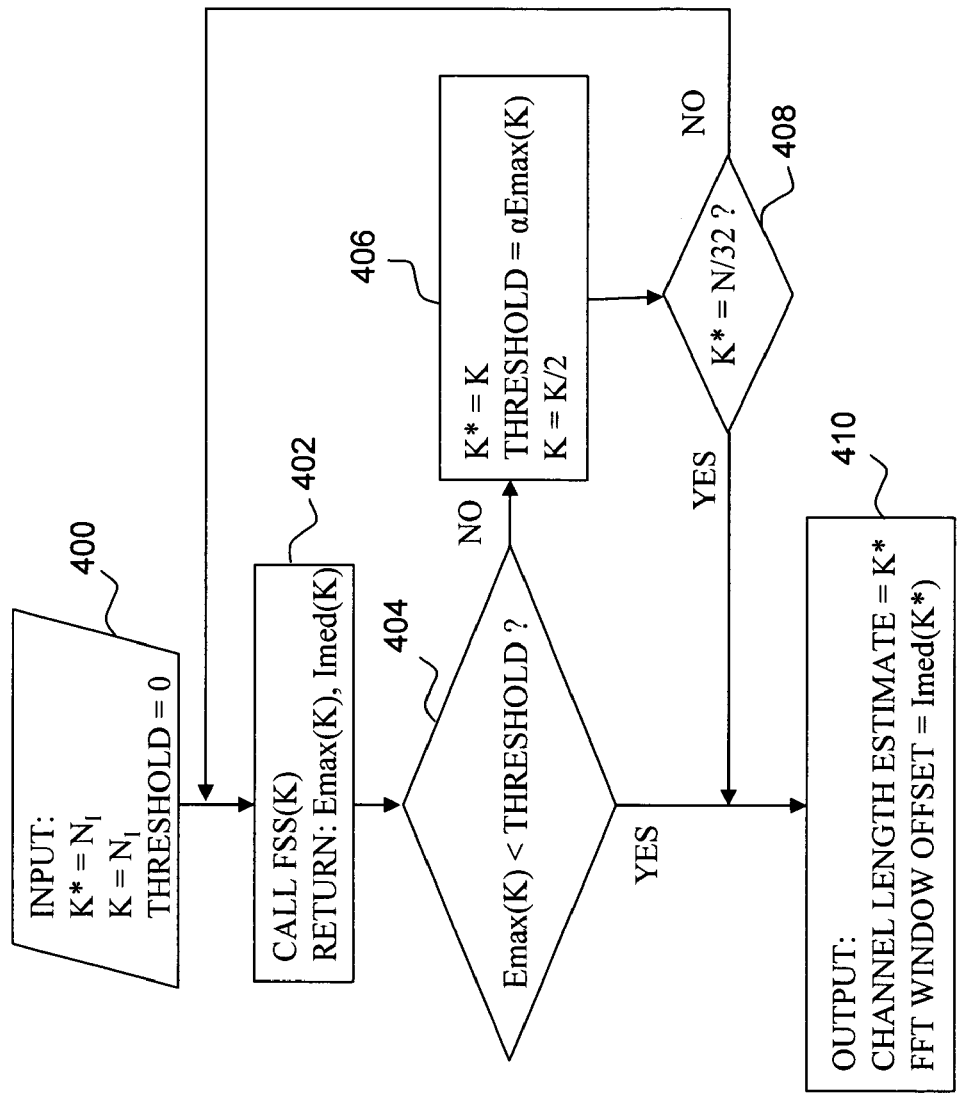
FIG. 4 is a flow chart illustrating calculation of a channel length estimate according to an embodiment of the present invention.

Operation of circuit 800 (FIG. 1B) will now be explained in detail with reference to the flow chart at FIG. 4. The circuit is initialized at input block 400 with $K^*=K=N_1$, where $K^*$ is the index of the final candidate channel length and K is the index of the current trial candidate channel length. Initial value $N_1$, is the index of the largest candidate channel length. Block 402 determines the maximum energy Emax(K) and FFT channel window placement Imed(K) for candidate channel length K. Decision block 404 then determines whether this maximum energy is less than the current threshold. Since the threshold was initialized to zero, the initial answer is NO, and control is transferred to block 406. Block 406 updates three values. First, $K^*$ is reset to the current index K. The threshold is then set to αEmax(K), where α is a nonzero fraction between zero and one. Finally, K is divided by two to select the next smaller candidate channel length. Control is then transferred to decision block 408. Decision block 408 determines whether the final candidate channel length has been evaluated. If it has and $K^*=N/32$, then control passes to output block 410, and the final channel length estimate is indicated by index $K^*$. Additionally, the FFT channel window offset is Imed($K^*$).

Alternatively, if the final candidate channel length has not been evaluated, control passes back to block 402. Block 402 again determines the maximum energy Emax(K) and channel window placement Imed(K) for the next candidate channel length K. Decision block 404 then determines whether this maximum energy is less than the updated threshold. If the maximum energy for this candidate channel length is approximately the same as the previous candidate channel length, values for the next smaller candidate channel length will be updated at block 406. Decision block 408 will again determine if all candidate channel lengths have been evaluated. If there are other candidate channel lengths, control is again passed to block 402. However, if the maximum energy of current candidate channel length K is less than αEmax($K^*$), then control passes to output block 410. The final channel length estimate is indicated by index $K^*$, and the FFT channel window offset is Imed($K^*$).

Figure 5:
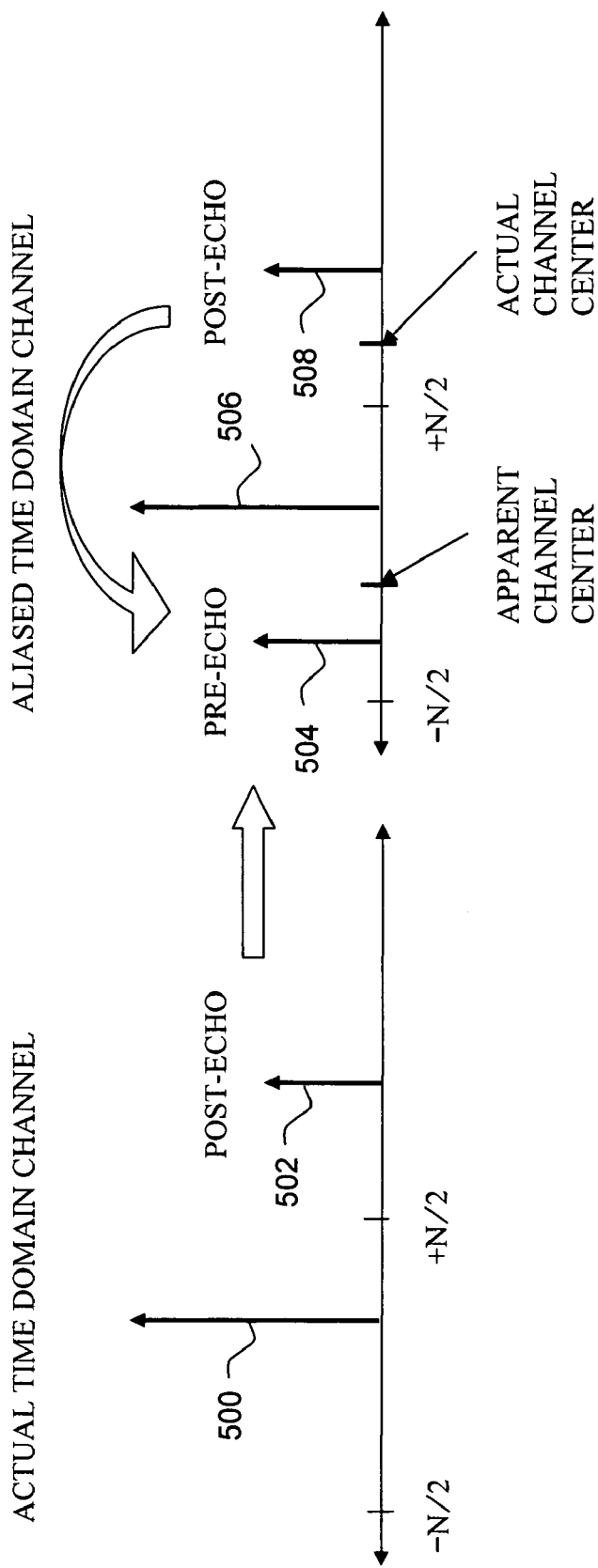
FIG. 5 illustrates a problem of aliasing in accurate channel window placement.

Referring back to FIG. 1B, in another embodiment of the present invention circuit 136 performs a hypothesis test to correct FFT window placement in the presence of an aliased time domain channel. The problem of an aliased time domain channel will be explained with reference to FIG. 5. An actual time domain channel is illustrated on the left in idealized form by arrow 500. By way of illustration, the FFT window extends from –N/2 to +N/2. A post-echo is illustrated by arrow 502. This post-echo arrow 502 may be a weaker signal from another base station. Due to a sampling error, however, it may be mistaken for a pre-echo signal. For example, an aliased time domain channel on the right shows an idealized actual channel as arrow 506. However, the post-echo arrow 508 may also be mistaken for a pre-echo arrow 504. The problem of post-echo arrow 508 and alias pre-echo arrow 504 is that the channel center may be incorrectly determined. For example, if post-echo signal 508 is correct, then the actual channel center lies between arrows 506 and 508. Alternatively, if pre-echo arrow 504 is construed as correct, then the corresponding apparent channel center is between arrows 504 and 506. There is a significant difference in data interpretation between these two possible window placements. The correct FFT window placement will produce well behaved clustered data. An incorrect FFT window placement, however, produces spurious data, resulting in a significantly lower SNR.

Figure 6:
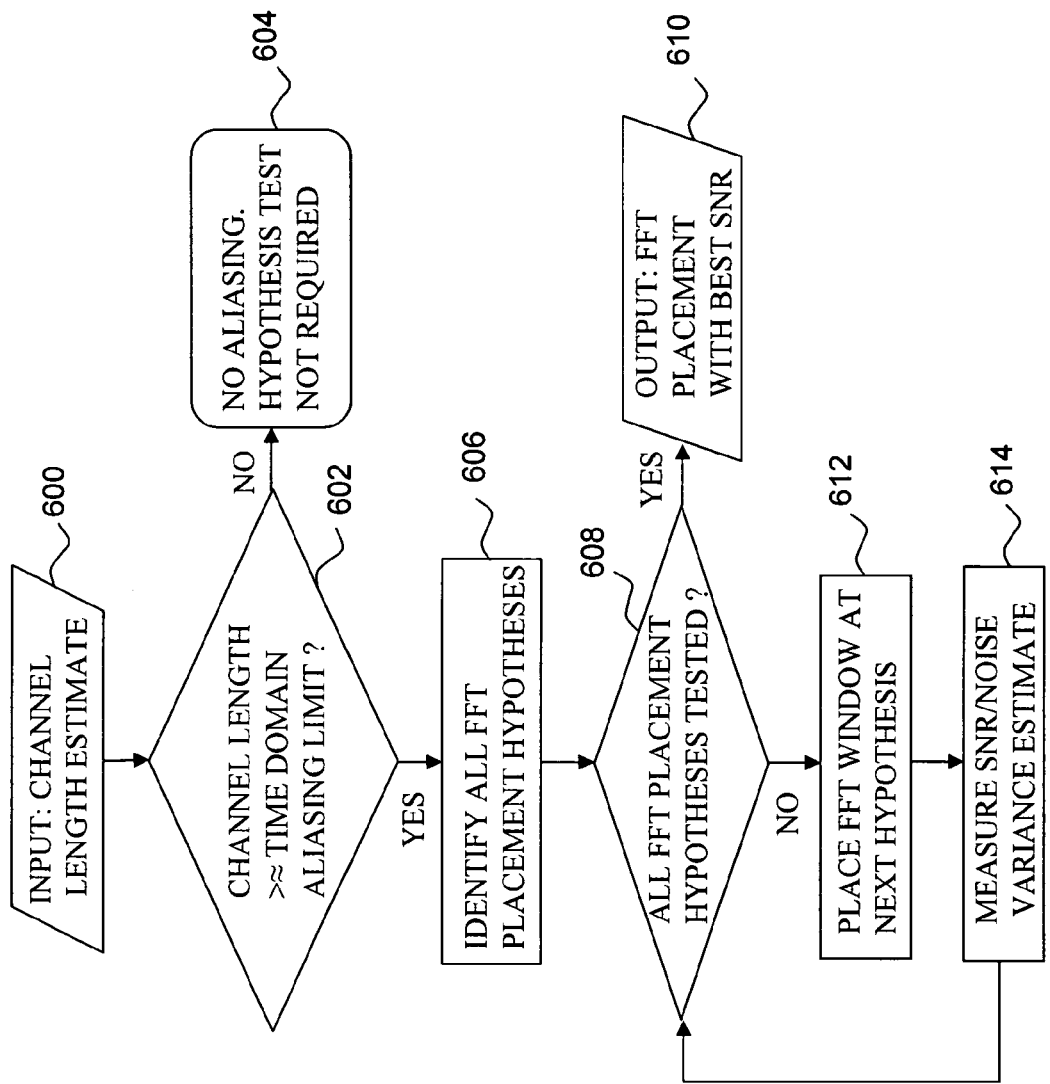
FIG. 6 is a flow chart illustrating hypothesis testing for accurate window placement by the receiver of FIG. 1A according to another embodiment of the present invention.

Operation of circuit 136 will now be explained in detail with reference to the flow chart at FIG. 6 and in view of the foregoing explanation. Circuit 136 receives an updated channel length estimate from circuit 410 (FIG. 1B). This is shown as input block 600 (FIG. 6). Decision block 602 determines whether the channel length is greater than or approximately equal to a time domain aliasing limit. If the channel length is less than the time domain aliasing limit, there will be no sampling error and no aliasing. Therefore, no hypothesis test is required at block 604. Otherwise, control passes to block 606 where all candidate FFT window placements are identified. Decision block 608 initially determines if all candidate FFT window placement hypotheses have been tested. If there are no more hypotheses to test, control passes to output block 610 where the candidate FFT window placement with the best SNR is selected. Noise variance or other signal quality metrics may also be used for this selection process. Alternatively, if there are remaining hypotheses to be tested, control passes from decision block 608 to block 612. Block 612 selects the next FFT candidate window placement and directs the FFT to repeat the conversion process via input 2 of switch 138 (FIG. 1B). Subsequently, circuit 136 receives a new SNR metric on lead 132 from soft output equalizer 118 (FIG. 1A) as illustrated by block 614. As previously discussed, the SNR metric indicates signal quality and is greater with well behaved data. Control then passes back to decision block 608 to determine if there are remaining hypotheses. The process continues until all hypotheses are evaluated and the best candidate FFT window placement is identified.

Figure 7:
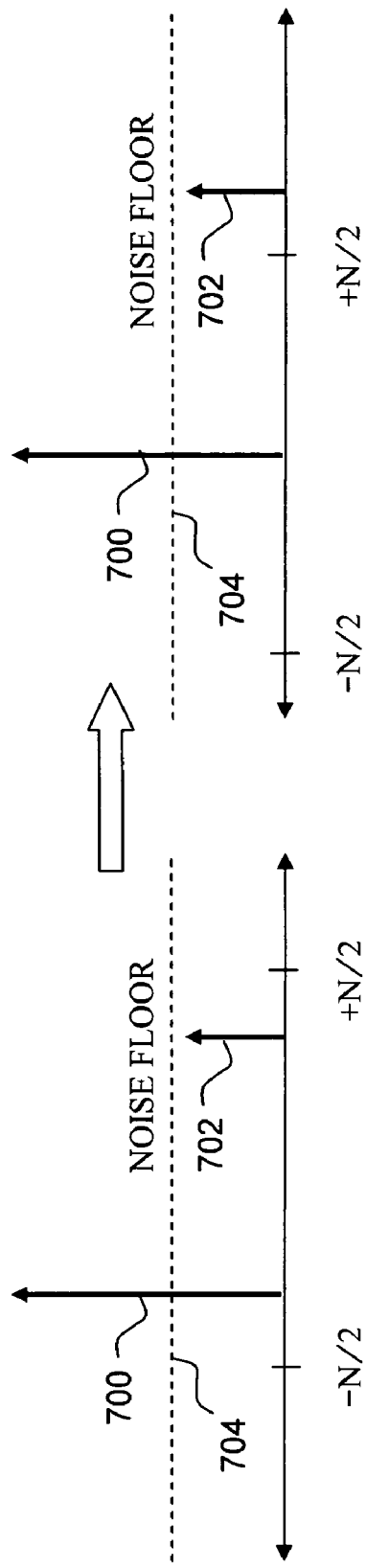
FIG. 7 illustrates a problem of distortion due to intermittent echoes within the received channel.

Referring again to FIG. 1B, yet another embodiment of the present invention improves FFT window placement in a fading channel environment by collection of long term statistics. The long term statistics are collected by circuit 144. Control circuit 140 receives these long term statistics and may override the hypothesis test FFT window placement. The motivation to collect long term statistics will now be explained with reference to FIG. 7. A correct FFT channel window is shown at the left extending from –N/2 to +N/2. The channel window includes a primary channel signal 700 and a weaker secondary channel signal 702. This secondary channel signal 702 may be from another base station as previously explained with regard to hypothesis testing. Optimal window placement preferably includes both signals, since signal 702 may eventually become the primary or dominant signal with mobile user equipment. In a fading channel environment, however, the strength of signal 702 may vary from time to time so that it is sometimes below a noise floor represented by dashed line 704. In this case, weak signal 702 may be undetected by hypothesis testing. This produces an actual channel window placement as shown in the diagram at the right. In this example, the FFT channel window is centered on primary channel signal 700 and the weaker channel signal 702 is excluded. This problem is preferably resolved by collection of long term channel signal statistics. These long term statistics advantageously identify weaker secondary channel signals that intermittently appear above the noise floor 704. Thus, the FFT window placement may be accurately adjusted even in a fading channel environment.

Figure 8A:
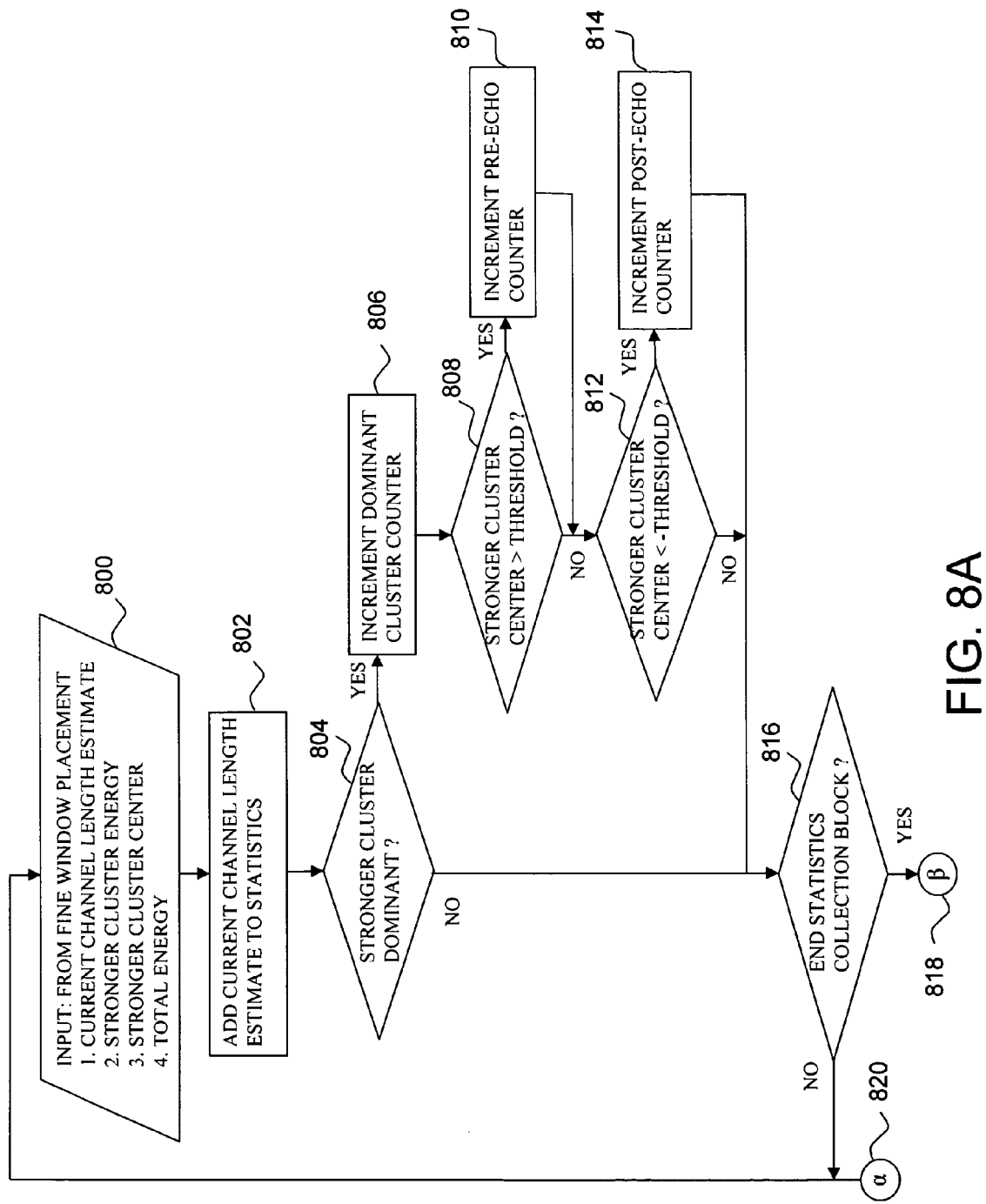
FIGS. 8A and 8B are a flow chart illustrating the use of long-term statistics by the receiver of FIG. 1A to identify intermittent echoes according to yet another embodiment of the present invention.
Figure 8B:
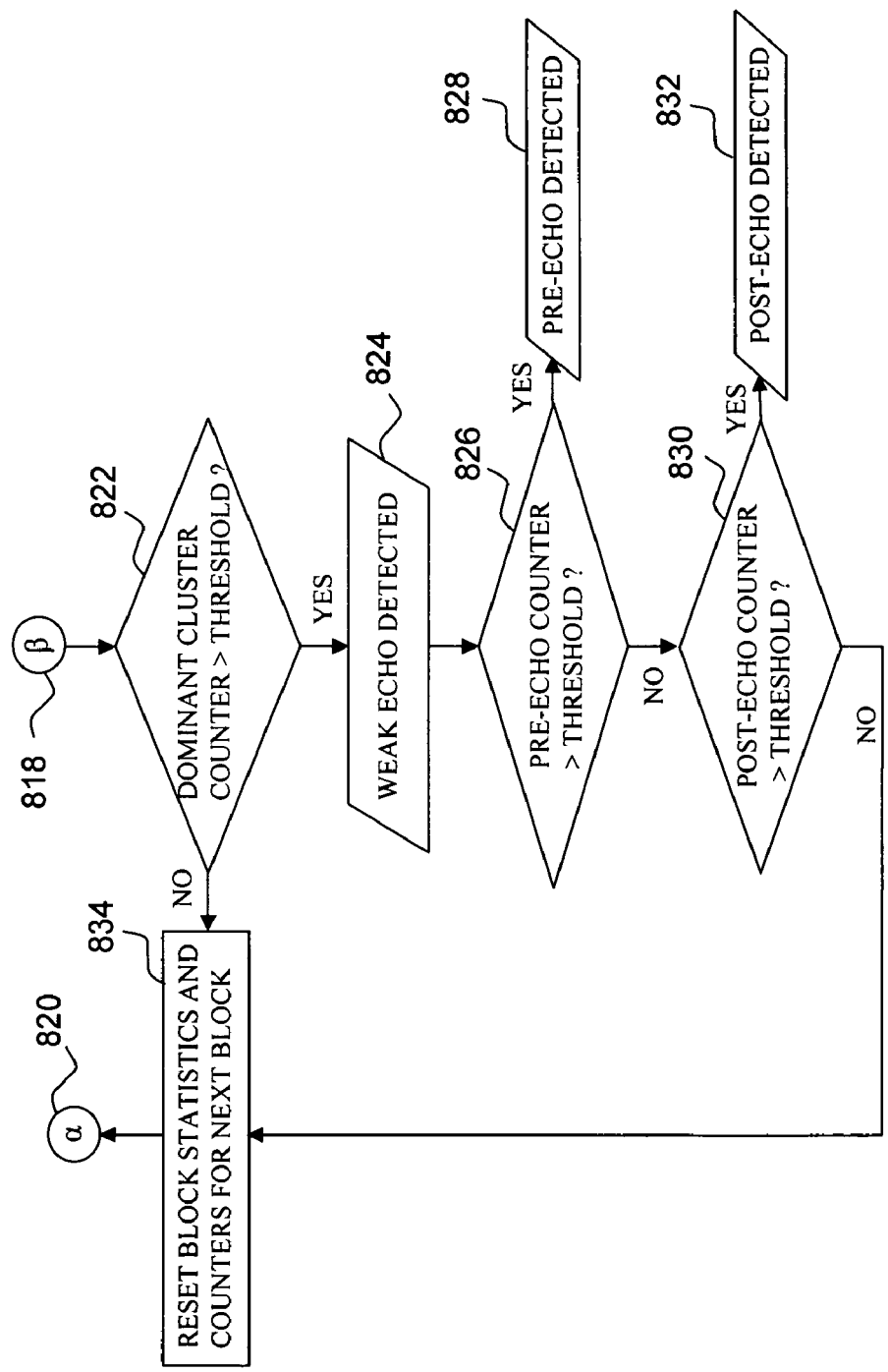

Referring now to the flow chart of FIG. 8A, operation of circuit 144 (FIG. 1B) will be explained in detail. Statistics collection circuit 144 initially receives a current channel length estimate from circuit 410 at input block 800. Input block 800 also receives the current data cluster energy, the current data cluster center, and the total channel energy. The current channel length estimate is collected at block 802. Decision block 804 determines whether the current data cluster is dominant in the channel. Here, a dominant data cluster is one with sufficient energy to exceed the noise floor 704 (FIG. 7) and not necessarily the strongest channel signal. If not, control passes to decision block 816 to determine whether the current statistics collection block is complete. The statistics block size is preferably determined by a threshold count that is likely to identify weaker fading channel signals. For example, a statistics block may include 100 sample data clusters. If the statistics collection block is complete, control passes to long term statistics based controller circuit 140 (FIG. 1B). This transfer of control is illustrated by connecter 818 which is also shown at FIG. 8B. Alternatively, if the statistics collection block is not complete, control passes from decision block 816 back to input block 800 to receive the next channel length estimate and data cluster parameters.

When decision block 804 determines that the channel currently has one dominant cluster, control passes to block 806 where a dominant cluster counter is incremented. Control then passes to decision blocks 808 and 812. If the dominant cluster center is greater than a threshold value, it appears before the primary channel signal and a pre-echo counter is incremented at block 810. Alternatively, if the dominant cluster center is less than a negative threshold value, it appears after the primary channel signal and a post-echo counter at block 814 is incremented. Control is then passed to decision block 816 to determine if the current statistics block is complete. If not, control returns to input block 800 and the previously described collection process continues. Otherwise, control transfers to circuit 140 (FIG. 1B) as indicated by connector 818.

Operation of long term statistics based controller 140 (FIG. 1B) will now be explained with reference to the flow chart at FIG. 8B. Controller circuit 140 receives a completed statistics block from statistics collection circuit 144. This completed statistics block includes a cumulative dominant cluster count, pre-echo count, and post echo-count. Decision block 822 compares the dominant cluster count to a threshold value to determine if a dominant data cluster appeared in the channel and above the noise floor often enough to be considered. If not, control passes to block 834 where current statistics counters are reset to zero. Then control is passed back to statistics collection circuit 144 (FIG. 1B) to begin a new collection block. This transfer of control is illustrated by connector 820 which is included in the flow chart of FIG. 8A. If the dominant cluster count exceeds the threshold value, decision block 822 passes control to output block 824 to indicate a weak echo is detected in the channel. Decision blocks 826 and 830 compare pre-echo and post-echo counts to their respective thresholds to further identify the weak echo. Either one or both of output blocks 828 and block 832 will respectively identify the weak echo as a pre-echo or post-echo signal. Based on the result of these statistics, control circuit 140 implements two actions. First, switch 142 (FIG. 1B) produces a new channel length estimate at lead 134 in response to the signal at input 2. Second, switch 138 directs a new FFT at a window placement indicated by input 3. Thus, a more accurate FFT window placement and channel length estimate are produced even in a fading channel environment. This improved FFT window placement greatly improves the SNR and provides improved signal quality.

Still further, while numerous examples have thus been provided, one skilled in the art should recognize that various modifications, substitutions, or alterations may be made to the described embodiments while still falling with the inventive scope as defined by the following claims.

What is claimed is:

1. A method of channel synchronizing a wireless receiver, comprising:
   selecting a plurality of different candidate channel placements;
   determining a plurality of groups of data signals, each group corresponding to a respective candidate channel placement;
   calculating a respective signal quality for each group; and
   selecting a candidate channel placement corresponding to the group having the best signal quality.

2. A method as in claim 1, wherein the respective signal quality is a signal-to-noise ratio.

3. A method as in claim 1, wherein the respective signal quality is a noise variance.

4. A method as in claim 1, wherein each candidate channel placement defines a plurality of data samples for a respective group of data signals.

5. A method as in claim 4, wherein the step of determining comprises determining a Fast Fourier Transform on the plurality of data samples.

6. A method as in claim 1, wherein the step of selecting comprises selecting a candidate channel placement in the time domain.

7. A method as in claim 1, wherein the step of selecting comprises selecting a candidate channel placement in the frequency domain.

8. A method as in claim 1, comprising the step of estimating a channel length for the plurality of data signals.

9. A method as in claim 1, wherein at least one of the groups of data signals includes a part of a cyclic prefix.

10. A method of channel synchronizing a wireless receiver, comprising:
   a) selecting a first candidate channel placement;
   b) receiving a plurality of groups of data signals, each group corresponding to the first candidate channel placement;
   c) identifying a strong signal in a group of data signals;
   d) identifying a weak signal in the group of data signals;
   e) comparing the weak signal to a first threshold value;
   f) incrementing a first counter conditionally in response to step (e); and
   g) repeating steps (c) through (f) for each group of the plurality of groups; and h) correcting the first candidate channel placement in response to a count in the first counter.

11. A method as in claim 10, comprising:

i) comparing the weak signal to a second threshold value;

j) incrementing a second counter conditionally in response to step (i);

k) repeating steps (c) through (j) for each group of the plurality of groups; and l) correcting the first candidate channel placement in response to a count in one of the first and second counter.

12. A method as in claim 11, comprising:

m) selecting a second candidate channel placement;

n) receiving a plurality of groups of data signals, each group corresponding to the second candidate channel placement; and o) repeating steps (c) through (l).

13. A method as in claim 10, comprising:

i) selecting a second candidate channel placement;

j) receiving a plurality of groups of data signals, each group corresponding to the second candidate channel placement; and k) repeating steps (c) trough (h).

14. A method as in claim 10, wherein the first candidate channel placement defines a plurality of data samples for a respective group of data signals.

15. A method as in claim 14, wherein the steps (c) and (d) comprise determining a Fast Fourier Transform on the plurality of data samples.

16. A method as in claim 10, wherein step (h) comprises correcting the first candidate channel placement in the time domain.

17. A method as in claim 10, wherein step (h) comprises correcting the first candidate channel placement in the frequency domain.

18. A method of channel synchronizing a wireless receiver, comprising:

selecting a plurality of different candidate channel placements;

determining a plurality of groups of data signals, each group corresponding to a respective candidate channel placement;

equalizing each group of the plurality of groups of data signals to produce a respective plurality of equalized groups;

calculating a respective signal quality for each of the plurality of equalized groups; and selecting a candidate channel placement corresponding to the group baying tbe best signal quality.

19. A method as in claim 18, comprising the steps of:

determining the plurality of groups of data signals in response to a first channel length;

comparing the best signal quality to a threshold;

accepting the first channel length and candidate channel placement in response to first result of the step of comparing; and estimating a second channel length in response to a second result of the step of comparing.

* * * * *